United States Patent [19]

Hamisch, Jr. et al.

[11] 4,173,293

[45] Nov. 6, 1979

[54] COMPOSITE LABEL WEB AND METHOD OF USING SAME

[75] Inventors: Paul H. Hamisch, Jr., Franklin, Ohio; David W. Hubbard, Stamford, Conn.

[73] Assignee: Monarch Marking Systems, Inc., Dayton, Ohio

[21] Appl. No.: 831,833

[22] Filed: Sep. 9, 1977

Related U.S. Application Data

[63] Continuation of Ser. No. 629,191, Nov. 5, 1975, abandoned.

[51] Int. Cl.² .......................... B32B 3/10; B65H 5/28

[52] U.S. Cl. .......................................... 221/1; 221/71

[58] Field of Search .................................... 221/70–74, 221/1

[56] References Cited

U.S. PATENT DOCUMENTS

| | | | |
|---|---|---|---|
| 3,502,398 | 8/1966 | Michelson | 352/37 |
| 3,783,083 | 1/1974 | Jenkins | 161/38 |

FOREIGN PATENT DOCUMENTS

| | | | |
|---|---|---|---|
| 1956104 | 6/1970 | Fed. Rep. of Germany | 221/70 |

*Primary Examiner*—Stanley H. Tollberg
*Attorney, Agent, or Firm*—Joseph J. Grass

[57] ABSTRACT

There is disclosed a composite label web, method of making a composite label web and method of using a composite label web. The composite label web is fed toward a delaminator at which the supporting material for the label is caused to undergo a sharp change in direction. The supporting material is provided with two columns of slits or cuts means. The slits are disposed at longitudinally spaced apart locations, and the slits of one column are laterally offset from the slits of the other column.

3 Claims, 6 Drawing Figures

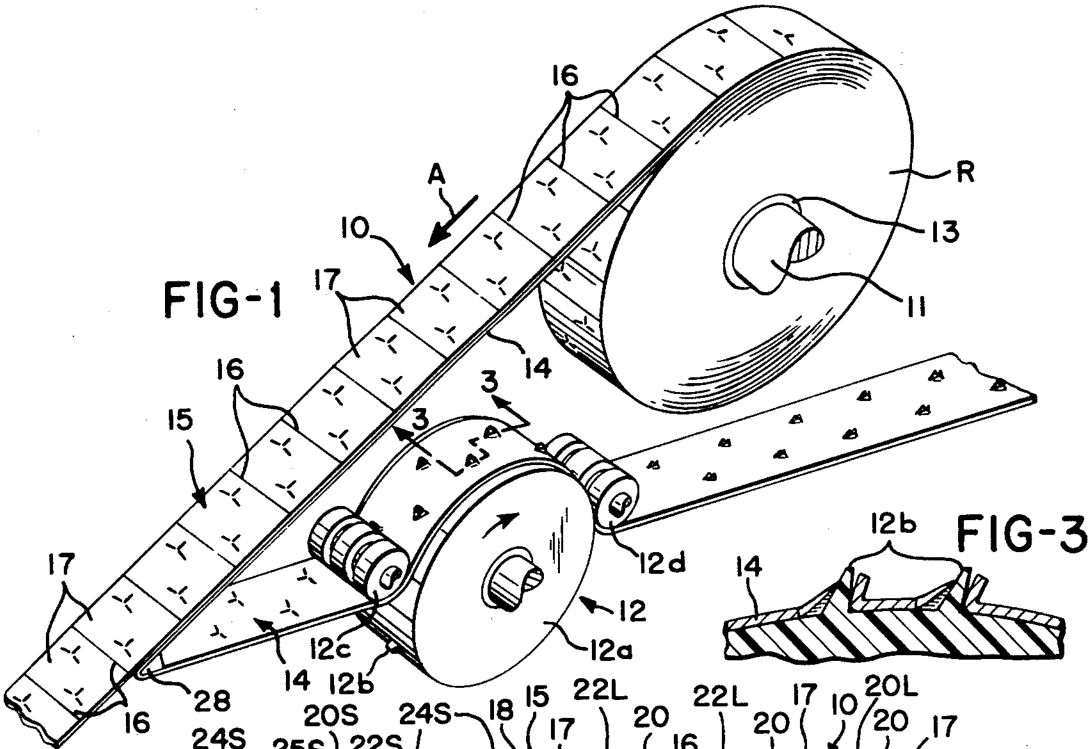
FIG-1
FIG-3
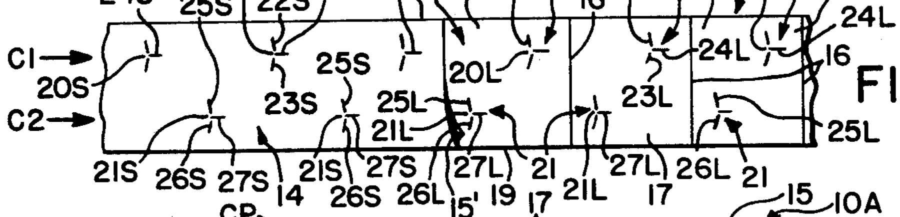
FIG-2
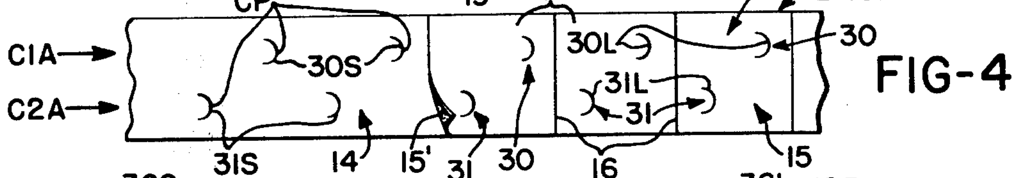
FIG-4
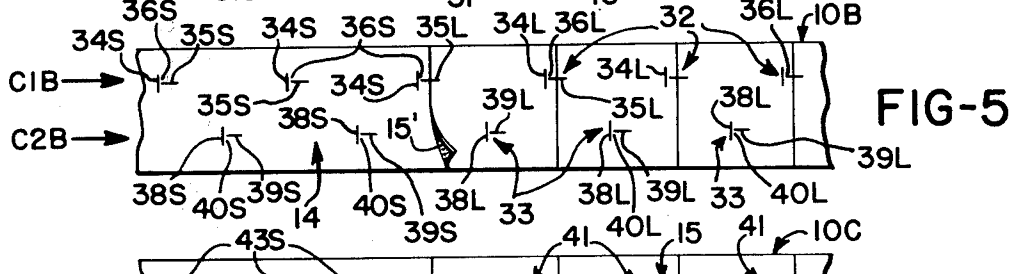
FIG-5
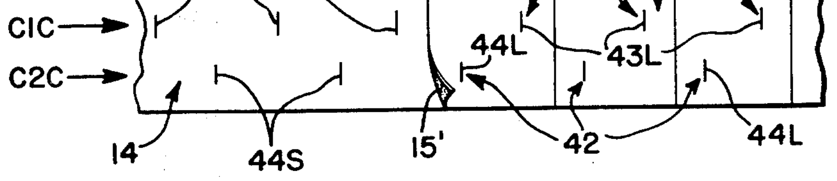
FIG-6

COMPOSITE LABEL WEB AND METHOD OF USING SAME

CROSS-REFERENCE TO RELATED APPLICATION

This is a continuation of application Ser. No. 629,191, filed Nov. 5, 1975, now abandoned.

BACKGROUND OF THE INVENTION

1. Field of the Invention

This invention relates to the art of composite label webs and to method of making and using same.

2. Brief Description of the Prior Art

It is known to provide composite label webs having two longitudinal columns of slit means arranged so that there are two slit means in each lateral row in the supporting material. Composite label webs and apparatus for dispensing labels carried on the webs are disclosed in U.S. Pat. No. 3,501,365 to E. C. Marshall issued Mar. 17, 1970 and in U.S. Pat. No. 3,800,701 to W. Martin issued Apr. 2, 1974. The provision of two columns of such slit means is advantageous over having only one column from the standpoint that for a given length of supporting material, additional teeth of a toothed driver can engage the supporting material web. However, in such prior art composite webs, the supporting material web is weakened in two locations in each lateral row. As the supporting material web is advanced and undergoes a sharp change in direction at a delaminator of the label dispensing apparatus, stresses in the tensioned supporting material web adjacent the slit means may occasionally cause the web to break. Another prior art U.S. Pat. No. 3,783,083 to W. A. Jenkins issued Jan. 1, 1974, discloses the benefits of having the cut means extend through both the supporting material web and the label material.

SUMMARY OF THE INVENTION

According to the invention there is provided a composite label web having the advantage of two columns of slit means without the disadvantage of weakening the supporting material web at two laterally aligned locations or rows. The advantage is obtained by having the slit means of one column laterally offset from the slit means of the other column. The invention also comprises method of making such a composite web and method of dispensing such a composite web.

BRIEF DESCRIPTION OF THE DRAWINGS

FIG. 1 is a perspective view of primary elements of a label dispensing apparatus, together with one embodiment of a composite label web incorporating the features of the invention;

FIG. 2 is a top plan view of the composite web shown in FIG. 1, with a portion of the label material being broken-away for the sake of clarity;

FIG. 3 is a sectional view taken generally along line 3—3 of FIG. 1;

FIG. 4 is a top plan view similar to FIG. 3, showing another embodiment of the invention;

FIG. 5 is a top plan view of another embodiment of the invention; and

FIG. 6 is a top plan view of yet another embodiment of the invention.

DETAILED DESCRIPTION OF THE PREFERRED EMBODIMENTS

With reference to FIG. 1, there is shown a composite label web 10 wound into the form of a roll R. The roll R is rotatable on a support 11 of a label dispensing apparatus generally indicated at 12. The apparatus 12 is shown to include a toothed feed wheel *12a* having teeth *12b* and guide rollers *12c* and *12d*. The roll R typically has a core 13 in which the support 11 is received. The composite web 10 comprises a longitudinally extending web of supporting or backing material generally indicated at 14 typically having a release coating (not shown) on its upper surface. The web 10 further comprises a web of label material generally indicated at 15 which is butt cut laterally as indicated at 16 to provide a series of labels 17. The underside of the label material 15 is provided with a coating of pressure sensitive adhesive 15'. The supporting material web 14 and the label material 15 are of the same width. Side edges 18 and 19 of the web 10 are shown to be straight as is preferred and the butt cuts 16 which are shown to extend laterally across the composite web 10, but only through the label material 15, are perpendicular to the side edges 18 and 19. Moreover, the butt cuts 16 are shown to be parallel to each other. The cutt cuts 16 do not extend into the supporting material web 14.

The composite label web 10 is shown to have two columns C1 and C2 of slit or cut means 20 and 21 extending through the supporting material web 14 and preferably also at least partly through and most preferably through the label material web 15. The slit means 20 and 21 are illustrated as being in a generally Y-shaped configuration. The knife cuts or slits of the slit means 20 in the label material are indicated at 22L, 23L, and 24L and the knife cuts or slits of the slit means 20 in the supporting material 14 are indicated at 22S, 23S and 24S. The knife cuts or slits of the slit means 21 in the label material 15 are indicated at 25L, 26L and 27L and the knife cuts or slits of the slit means 21 in the supporting material web 14 are indicated at 25S, 26S and 27S. The slits 22S, 23S and 24S are aligned with respective slits 22L, 23L and 24L of the respective slit means 20. The slits 24L and 24S lie along a straight longitudinally extending line. The slits 25S, 26S and 27S are aligned with respective slits 25L, 26L and 27L of the respective slit means 21. The slits 27L and 27S lie along a straight longitudinally extending line which is parallel to the other straight longitudinally extending line mentioned above. The slits 22L, 23L and 24L are spaced apart by a frangible portion 20L and the slits 22S, 23S and 24S are spaced apart by a frangible portion 20S. Likewise, the slits 25L, 26L and 27L are spaced apart by a frangible portion 21L and the slits 25S, 26S and 27S are spaced apart by a frangible portion 21S.

The slit means 20 and 21 of the respective columns C1 and C2 are laterally offset as shown so that only one slit means 20 and 21 and not both passes across the delaminator 28 of apparatus 12 at any one time. The spacing of the slit means 20 is equal and the spacing of the slit means 21 is equal. The spacings of the slit means 20 and 21 is preferably the same. However, the slit means 20 and 21 are laterally offset from each other. The amount of offset need not be great, and benefits will be derived so long as there is some offset or staggering of the slit means of one column C1 with respect to those of the other column C2. According to the invention, there is only one slit means 20 or 21 at any one location along a line perpendicular to the longitudinal direction of the columns C1 and C2.

In the embodiment of FIG. 4, composite label web 10A is identical to the composite label web 10, except for configuration and orientation of slit or cut means 30 and 31. Each slit means 30 and 31 includes a generally C-shaped or U-shaped knife cut or slit 30S and 31S, respectively, in the supporting material web 14 and a generally C-shaped or U-shaped knife cut or slit 30L and 31L, respectively, in the label material 15. The slits 30S and 30L, and 31S and 31L, of each respective slit means are aligned with each other. This is effected by making a single knife cut through both the supporting material 14 and the label material 15. As in the embodiment of FIGS. 1, 2 and 3, the slit means 30 and 31 are arranged in two straight columns C1A and C2A and the slit means 30 of column C1A are laterally offset from the slit means 31 of column C1B. Also, the slit means 30 and 31 are completely within the confines of the end and side edges of the labels 17, as the slit means 20 and 21 of the embodiment of FIGS. 1, 2 and 3.

In the embodiment of FIG. 5, composite label web 10B is identical to the composite label web 10, except for configuration and orientation of slit or cut means 32 and 33. Each slit means 32 and 33 is in a generally T-shaped configuration. Each slit means 32 is shown to include spaced apart slits or knife cuts 34S and 35S in the supporting material web 14 and spaced apart knife cuts or slits 34L and 35L in label material 15. The slits 34S are shown to be lateral and more particularly perpendicular to the longitudinal direction of the web 14, while the slits 35S are shown to be longitudinal and perpendicular to respective slits 34S. The land 36S between respective slits 34S and 35S constitutes a frangible portion which is severed or ruptured by a tooth of the toothed driver. Each slit means 33 includes spaced apart slits or knife cuts 38S and 39S in the supporting material web 14 and spaced apart knife cuts or slits 38L and 39L in the label material 15. The lands 40S between respective slits or knife cuts 38S and 39S constitute frangible portions. The frangible portions 36S and 40S can be severed or ruptured by a tooth of the toothed driver. The slits 34S and 35S are aligned with respective slits 34L and 35L, and the slits 38S and 39S are aligned with respective slits 38L and 39L. The label material also has frangible portions 36L and 40L. As in the above embodiments, the slit means 32 and 33 are arranged in two columns C1B and C2B and the slit means 32 of column C1B are laterally offset from the slit means 33 of column C2B.

In the embodiment of FIG. 6, composite label web 10C is identical to the composite label web 10, except for configuration and orientation of slit or cut means 41 and 42. Each slit means 41 and 42 includes a respective slit or knife cut 43S and 44S in the supporting material web 14 and a respective slit or knife cut 43L and 44L in the label material 15. The slits 43S and 43L are aligned with each other, and the slits 44S and 44L are aligned with each other. As in the above embodiments, the slit means 41 and 42 are arranged in two columns C1C and C2C and the slit means 41 of column C1C are offset from the slit means 42 of column C2C.

In all of the embodiments of the invention, the lateral slits or the lateral portion of the slits in one column are also offset from each other and also from the butt cuts. Offsetting of the slits 22S and 23S and slits 25S and 26S, offsetting the central lateral portions CP of the slits 30S and 31S, offsetting the slits 34S and 38S, and off-setting the slits 43S and slits 44S is especially important because these slits and these portions of these slits cause lateral weakening in the web 14. The driver used to feed the web 10C preferably has blade-like teeth as best shown in the above-mentioned U.S. Pat. No. 3,800,701.

The direction of feed in the web 10 toward the delaminator 28 is preferably in the direction of arrow A. The direction of feed in the webs 10A, 10B and 10C is preferably from right to left as viewed in respective FIGS. 4, 5 and 6.

Other embodiments and modifications of this invention will suggest themselves to those skilled in the art, and all such of these as come within the spirit of this invention are included within its scope as best defined by the appended claims.

We claim:

1. In a method of successively dispensing pressure sensitive labels releasably attached to a carrier web of supporting material, the method including the steps of rotatably supporting a supply roll of a composite web of the labels on the carrier web, directing the carrier web about a sharp angle of a delaminator to a rotary feed wheel having peripherally spaced teeth for engaging the carrier web at longitudinally spaced slit means within the carrier web, and pulling the carrier web around the delaminator with the feed wheel to peel the labels successively from the carrier web, the improvement comprising the steps of locating the slit means within the carrier web in longitudinally extending and laterally spaced rows, and staggering the slit means within one row longitudinally relative to the slit means in the other row to provide for passing only one slit means at a time around the delaminator for substantially eliminating tearing of the carrier web at the delaminator.

2. A composite label web of pressure sensitive labels releasably attached to a carrier web of supporting material for use in a label dispensing apparatus having means for rotatably supporting a supply roll of the composite label web, a delaminator for directing the carrier web about a sharp angle, a rotary feed wheel having peripherally spaced teeth for engaging the carrier web at longitudinally spaced slit means within the carrier web and for pulling the carrier web around the delaminator to strip the labels successively from the carrier web, wherein the composite label web includes slit means disposed within the carrier web in longitudinally extending and laterally spaced rows with the slit means within one row being longitudinally staggered from the slit means in the other row to provide for passing only one slit means at a time around the delaminator for substantially eliminating tearing of the carrier web at the delaminator.

3. A composite web as defined in claim 2, wherein each slit means includes a generally lateral slit.

* * * * *